US008346747B2

(12) United States Patent
Liu et al.

(10) Patent No.: US 8,346,747 B2
(45) Date of Patent: Jan. 1, 2013

(54) EXTENDING DATABASE TABLES IN A MULTI-TENANT ENVIRONMENT

(75) Inventors: Chang H. Liu, Beijing (CN); Ning Wang, Beijing (CN); Qi R. Wang, Beijing (CN); Xiao F. Wang, Beijing (CN); Zhen C. Xiao, Beijing (CN); Chun L. Zhang, Beijing (CN); Ying H. Zhou, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/053,032

(22) Filed: Mar. 21, 2011

(65) Prior Publication Data

US 2011/0238709 A1 Sep. 29, 2011

(30) Foreign Application Priority Data

Mar. 23, 2010 (CN) .......................... 2010 1 0132487

(51) Int. Cl.
*G06F 17/30* (2006.01)

(52) U.S. Cl. ........................................ 707/705; 707/803

(58) Field of Classification Search .................. 707/705, 707/803

See application file for complete search history.

(56) References Cited

U.S. PATENT DOCUMENTS 7,529,728 B2 * 5/2009 Weissman et al. .................... 1/1
7,779,039 B2 8/2010 Weissman et al.
2003/0212830 A1 * 11/2003 Greenblat et al. ............ 709/251
2005/0223022 A1 10/2005 Weissman et al.
2005/0278270 A1 12/2005 Carr et al.
2008/0013473 A1 * 1/2008 Proctor et al. ................ 370/315
2008/0016032 A1 1/2008 Dettinger et al.
2008/0201701 A1 * 8/2008 Hofhansl et al. .............. 717/168
2008/0270459 A1 10/2008 Grewal et al.
2009/0010642 A1 * 1/2009 Sui et al. ........................... 398/9
2009/0055424 A1 2/2009 Zhuang et al.
2009/0109869 A1 * 4/2009 Hsiao et al. ................... 370/254
2011/0164617 A1 * 7/2011 Yong ............................. 370/392
2011/0265069 A1 * 10/2011 Fee et al. ...................... 717/151
2012/0041986 A1 * 2/2012 Weissman et al. ............ 707/793

OTHER PUBLICATIONS

Frederick Chong, Gianpaolo Carraro, and Roger Wolter. Multi-Tenant Data Architecture, Jun. 2006, MSDN Library—Software and Services, Microsoft Corporation, retrieved from <<http://msdn.microsoft.com/en-us/library/aa479086(d=printer).aspx>>.

H. Hacigümüs, B. Iyer and S. Mehrotra. Providing database as a service, IEEE International Conference on Data Engineering (ICDE), San Jose, California, 2002.

Stefan Aulbach, Torsten Grust, Dean Jacobs, Alfons Kemper and Jan Rittinger, Multi-Tenant Databases for Software as a Service: Schema-Mapping Techniques, Proceedings of the 2008 ACM SIGMOD International Conference on Management of Data, SIGMOD'08, Jun. 9-12, 2008, Vancouver, BC, Canada, Publisher: Association for Computing Machinery, New York, New York.

Peter Mell and Tim Grance, The NIST Definition of Cloud Computing, Version 15, Oct. 7, 2009, National Institute of Standards and Technology, Information Technology Laboratory, Gaithersburg, MD, retrieved from <<csrc.nist.gov/groups/SNS/cloud-computing/cloud-def-v15.doc.>>.

* cited by examiner

*Primary Examiner* — Kim Nguyen
(74) *Attorney, Agent, or Firm* — Patterson & Sheridan, LLP

(57) ABSTRACT

Embodiments relate to database technology, and more specifically, to extending database tables in a multi-tenant environment. A method for extending a database table, includes receiving a request of a tenant for extending a database table; and generating a description file corresponding to the tenant according to the received request, the description file describing an extended field defined for the database table as at least one extended column.

17 Claims, 10 Drawing Sheets

| Sex | Last Name | First Name |
| --- | --- | --- |
| | | |
| | | |
| | | |

Fig. 4A

| Sex | Last Name | First Name | X_COL |
| --- | --- | --- | --- |
| | | | |
| | | | |
| | | | |

Fig. 4B

| Sex | Last Name | First Name | ID |
|---|---|---|---|
| | | | |
| | | | |
| | | | |

Fig. 4C

| Sex | Last Name | First Name | Home Address |
|---|---|---|---|
| | | | |
| | | | |
| | | | |

Fig. 4D

EXTENDING DATABASE TABLES IN A MULTI-TENANT ENVIRONMENT

CROSS-REFERENCE TO RELATED APPLICATIONS

This application claims foreign priority benefits under 35 U.S.C. §119 to co-pending Chinese patent application number CN 201010132487.0 filed Mar. 23, 2010. This related patent application is herein incorporated by reference in its entirety.

BACKGROUND

The software industry is now undergoing a profound transformation due to the appearance of SaaS (Software as a Service). In many countries, SaaS is already popular and widely used. With rapidly changing security techniques of SaaS, more and more enterprises come to accept the security and reliability of SaaS. Based on the Internet characteristics, SaaS software has many unique features over previous-generation software, and many new techniques have emerged among server software, databases, data transmission, and client browsers.

Development of each SaaS software system is based on multi-tenancy. That is, a set of software and database platforms is simultaneously used by multiple enterprises (or multiple tenants in an enterprise) through techniques such as software and database isolation and confidentiality. Although non-multi-tenant SaaS products are not necessarily "fake SaaS" products, multi-tenancy greatly increases the operation efficiency and stability, reduces the maintenance and upgrading cost for operators and finally gives implicit price benefits to customers.

In a SaaS system, how to handle access of multiple tenants to a database is a tougher challenge compared with application computational logic/level, and how to meet different demands of tenants on database table extension is a fundamental one among problems concerning "access of multiple tenants to a database." For example, assume there is a basic information statistical Table I in a certain SaaS employee information system. In Table I, Tenant A needs to record an employee code of each employee for identifying employees, while Tenant B does not need to record an employee code of each employee but identifies its employees by home addresses. A problem occurs when designing data tables for this employee information system, because it is hard to predict which demands will be imposed by future tenants on this database table.

There are some known techniques for extending database tables in a multi-tenant environment. According to one solution, in designing a multi-tenant SaaS application system, database table columns which allow extension by tenants according to their different demands may be defined for each database table. In the above described example, it is possible to define an extensible blank table column in Table I when designing the employee information system. Hence, Tenant A may select this blank table column as the "employee code" column, while Tenant B may select this blank table column as the "employee home address" column. In this manner, tenants may define the predefined extensible blank table column as a desired table column according to their own demands, and further complete database operations such as data input and query. However, this solution has a distinct disadvantage in that if developers provide only a few extensible blank table columns during system design, it might be impossible to satisfy demands of all tenants for database table extension. On the other hand, if system developers provide a large number of extensible blank table columns, the database table will occupy and waste a large space, because many extensible table columns might be required by only several tenants. What is worse, both these two disadvantages may be present in some cases, i.e., some tenants' demand cannot be satisfied and the low efficiency of many extensible table columns wastes too much space. Another disadvantage of this solution lies in that the data may be correctly explained merely by use of joint operation, since the predefined extensible blank table column does not contain data type and other relevant information (e.g., numeric type, date type, string type), and the information must be defined by tenants themselves. This will consume a mass of computational resources and further affects the system performance and user experience. In addition, such a solution requires developers of a multi-tenant application system to have a sufficient understanding of tenant demands, which increases the burden on the system developers.

According to another known solution, private data (data table columns to be extended) is stored for each tenant by creating a private table. This solution has several obvious disadvantages. Firstly, many private tables would need to be created in a multi-tenant system in order to satisfy the demand of unknown tenants, and the number of private tables that can be created is limited by a database management system DBMS. Moreover, the operation of a tenant on created private data (data in an extensible table column) is entirely dependent on the joint operation between a private table and a public table. This will consume a large amount of computational resource and further affect the system performance and user experience.

SUMMARY

Embodiments of the invention provide a computer-implemented method, computer program product and system for performing an operation for extending a database table. The operation includes receiving a request of a tenant for extending the database table in a multi-tenant database system, where the tenant issuing the request is one of a plurality of tenants. The operation also includes generating a description file corresponding to the tenant and to the database table according to the received request, the description file describing an extended field defined for the database table as at least one extended column.

BRIEF DESCRIPTION OF THE DRAWINGS

The above and other features of the embodiments of the present invention will become more apparent from the detailed description of the embodiments, when taken in conjunction with the figures wherein like numerals denote the same or like components. In the figures.

FIGS. 4A-4D illustrate views of table structural changes of an instance for extending the table according to a further embodiment of the present invention, among which FIG. 4A illustrates an unextended table "employee" in a multi-tenant system (platform), FIG. 4B illustrates the table "employee" for which an extended field is defined, i.e., an actual table structure in a backend database of the multi-tenant system after the extended field is defined, FIG. 4C illustrates a frontend (tenant end) data structure presentation after tenant 1 adds the desired column "ID," and FIG. 4D illustrates a frontend (tenant end) data structure presentation after tenant 2 adds the desired column "Home Address";

DETAILED DESCRIPTION

Embodiments of the present invention make the process of extending a database table transparent to either developers of the multi-tenant system or tenants themselves, to provide a uniform data model to tenants for database tables extension (customization), and to achieve the technical effect of extending a database table without occupying or wasting a large amount of database space.

Figure 1:
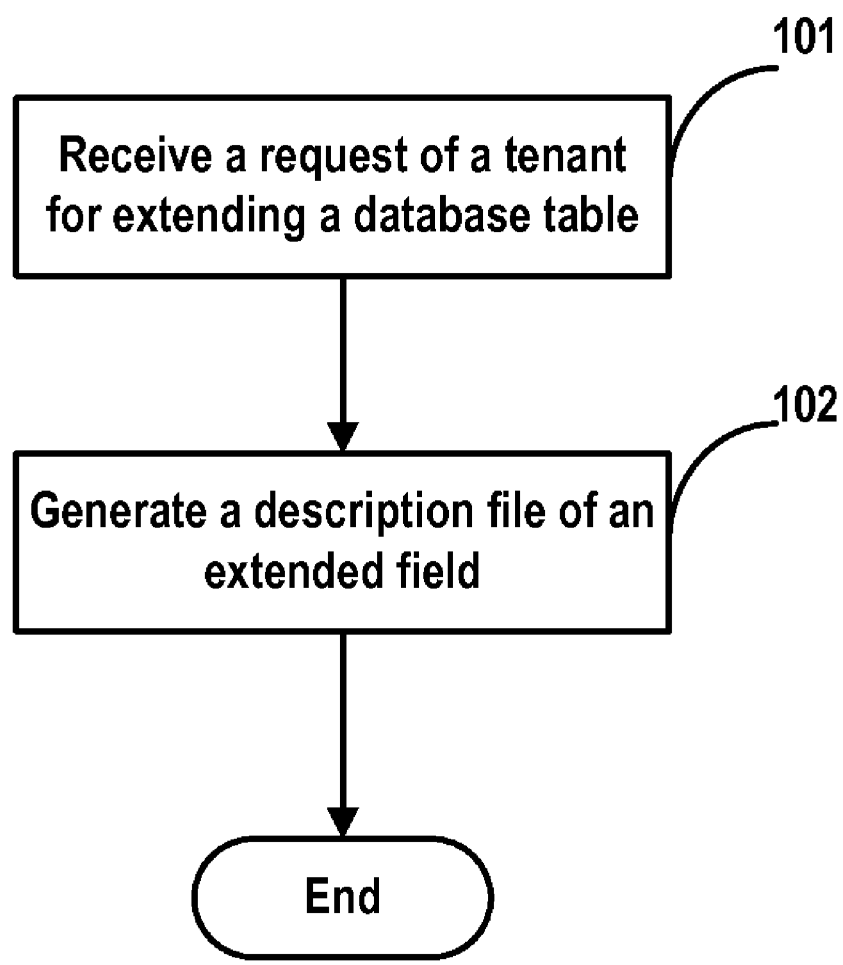
FIG. 1 illustrates a flowchart of a method for extending a database table according to an embodiment of the present invention.

FIG. 1 illustrates a flowchart of a method for extending a database table according to an embodiment of the present invention. It should be noted that throughout the specification, claims, and figures, "extending a database table" does not necessarily mean physically or practically extending a database table but might mean producing the effect or user experience that a database table for tenants in a multi-tenant system is extended, although the database table is not physically or practically extended.

In step 101, a request for extending a database table is received from a tenant. According to an embodiment of the present invention, the tenant's request for extending a database table may be an SQL statement like "ALTER TABLE employee ADD COLUMN homeaddress varchar(100)." In a multi-tenant system, it is possible that some tenants need to extend an original database table while others not, and tenants requesting extension may have varying requirements as to how many and which columns are extended. Requests for extending a database table may be expressed in various forms. In the above example, the tenant may express his request for extending a database table by inputting "ALTER TABLE . . . ADD COLUMN" in the SQL statement or in other any possible statement and mode. As long as the tenant's request contains a purpose (although it might not be the only purpose) for extending a database table, it is deemed that the tenant makes a request for extending a database table. Of course, the multi-tenant system (platform) may set some restrictions on types or formats of request for extending a database table.

The flow then proceeds to step 102 where a description file corresponding to the tenant and the database table is generated according to the received request. The description file describes an extended field defined for the database table as at least one extended column. Hereinafter, the meaning of the extended field and the process of defining the same will be described in detail.

In a multi-tenant application system or platform, developers of the system or platform have defined some database table that may include some basic table columns (i.e., table columns that will be needed by whatever tenants). For example, in such a multi-tenant system as the employee information management system, the system's developers might have defined a table called "employee" including columns which will be used by all tenants, such as "employee name" and "employee gender." According to one embodiment, there is one more extended field that may be used by respective tenants for extension according to their own demands besides these table columns that are already defined by developers of the multi-tenant system. At this point, this extended field is not limited with respect to the heading or information type of the table column to be extended, because developers of the multi-tenant system may not precisely predict what table columns will be needed by tenants. In addition, this extended field is not a blank column in a common sense, because a blank column actually corresponds to a data storage space reserved for an original database table and the number of blank columns must be determined in advance. According to an embodiment of the present invention, however, it is possible to define only one extended field and to extend any number of table columns from this extended field. According to an embodiment of the present invention, the extended field defined for the database table is a field of an extensible markup language (XML) type, and for this field of an XML type, a variety of description files may be used to verify the validity of XML data. According to another embodiment of the present invention, the extended field defined for the database table is a field of a Javascript object notation (hereinafter referred to as Json for short) type. Those skilled in the art should understand that besides XML and Json, other types of extended fields may be defined according to different types of databases, and they also fall within the scope of the present invention.

When the extended field defined for the database table is of an XML type, according to an embodiment of the present invention, an extended field of an XML type is defined in database tables of a multi-tenant system or platform before this multi-tenant system or platform is launched. According to another embodiment of the present invention, extended field of an XML type is not defined in database tables before a multi-tenant system or platform is launched, but defined in database table when a request for extending a database table is received from a tenant. These two embodiments are also applicable for defining an extended field of a Json type. That is, there is no absolute, temporal sequence between step 101 of FIG. 1 and "defining an extended field for a database table." In the first embodiment (first defining an extended field is defined for a database table and then performing step 101), before the multi-tenant system or platform is launched, an XML extended field is added for the table in the database by means of the following statement: ALTER TABLE employee ADD COLUMN X_COL XML, where "employee" is the table's name, and "X_COL XML" refers to an extended field of an XML type. In the second embodiment (first performing step 101 and then defining an extended field for a database table), the tenant's request for extending a database table may be, for example, ALTER TABLE employee ADD COLUMN homeaddress varchar(100). Here, "homeaddress" indicates that the tenant wants to add a column named "homeaddress" to the table "employee," and "varchar(100)" indicates that the column has a variable-length character type with no more than 100 characters. When a request for extending a database table as described above is received from a tenant in step 101, an extended field of an XML type is defined in the "employee" table, and then a description file describing the defined extended field as at least one extended column is generated according to the content of the request received from the tenant for extending a database table. The manner for generating the description file will be described below. Those skilled in the art should understand that other embodiments may be adopted. For example, for a part of tables, an extended field may be defined before the multi-tenant system or platform is launched, while for another part of tables, an extended field is defined when a request for extending a database table is received from a tenant during real-time operation. However, once an extended field is already defined in a table, when either tenant makes a request for extending a database table, the extended field does not need to be redefined but only a new description file is generated. That is, for a specific table, an extended field is suitable for multiple or even all tenants (i.e., shared by multiple tenants). Those skilled in the art should further understand that the above-described extended field defining and statement of a request from a tenant are merely exemplary and not limiting the protection scope of the present invention. According to different types of databases, those skilled in the art may adopt other statements that still fall within the protection scope of the present invention.

According to an embodiment of the present invention, only one extended field is defined for one database table regardless of whether the extended field is defined before the multi-tenant system or platform is launched or when a request for extending a database table is received from a tenant, regardless of the number of tenants, and regardless of the number of database table columns to be extended by each tenant. This is because both XML and Json are descriptive languages which may be used to describe one field extended in various manners by means of description files, such that a variety of description files may be generated according to different tenants' demands for extending the database table.

Further, it should be noted specially that it is not necessary to know concrete content (including data format information, heading of column and so on) of database table columns to be extended by a tenant, regardless of whether the extended field is defined before the multi-tenant system or platform is launched or when a request for extending a database table is received from this tenant. That is, the operation of extending a database table is transparent to either tenants or developers of the multi-tenant system. This is because developers of the multi-tenant system do not need to know what kind of table columns are to be extended by tenants when defining the extended field, and a tenant using the multi-tenant system may initiate an extension of table columns by simply submitting an SQL statement for extending a database table in a traditional way without the knowledge that an extended field is already defined in the original database table. In the embodiment where an extended field is defined when a request for extending a database table is received from a tenant, this extended field is not defined based on the content of the request, but it is automatically defined so long as a request for extending a specific table is received from any tenant, regardless of the specific content of table columns being requested to be extended. In addition, once an extended field is defined, it will not be refined hereafter when a request for extending a database table is received from a tenant (whether the same tenant or other tenant); instead, the flow directly proceeds to step 102 to generate a description file.

The process of generating a description file in step 102 will be described in detail below. Although there might be only one defined extended field for one table, this extended field can be extended by each tenant to any number of and any type of table columns. This is achieved due to the fact that for one extended field (for example, an extended field of an XML type is a descriptive extended field), it is possible to generate various description files and thus achieve the effect of extending a database table. According to an embodiment of the present invention, the description file is an XML schemas definition (hereinafter referred to as "xsd" for short) file. According to another embodiment of the present invention, the description file is a document type definition (hereinafter referred to as "dtd" for short) file.

Continuing the foregoing example, when a request for extending a database table, ALTER TABLE employee ADD COLUMN homeaddress varchar(100), is received from a tenant, an xsd description file being generated is as below:

```
<?xml version="1.0" encoding="UTF-8"?>
  <xs:schema xmlns:xs="http://www.aa.org/2001/XMLSchema"
  targetNamespace="http://www.bb.com/database/ tenant1"
  xmlns="http://www.bb.com/database/ tenant1">
    <xs:element name="X_COL" type="xs:string" maxOccurs="1"
      minOccurs="1">
        <xs:attribute name="homeaddress" type="xs:string"
          use="optional">
    </xs:attribute>
  </xs:element>
</xs:schema>
```

Optionally, if a dtd file is used as a description file, a description file being generated is as below:

```
<!DOCTYPE X_COL [
  <!ELEMENT X_COL    (homeaddress)>
  <!ELEMENT homeaddress    (#PCDATA)>
]>
```

It should be noted that regardless of the manner in which the description file is generated, the description file being generated corresponds to the tenant submitting a request for extending a database table and to the database table. Only in this way, can each tenant extend a specific database table according to his own demand while extension made by one tenant will not affect another tenant, such that the database table is extended in a customized fashion. If the above description file is generated in response to the request of tenant 1 for extending a database table, then the description file may be named "tenant 1.xsd" or "tenant 1.dtd". The description file may also be named as "employee-tenant 1.xsd" to reflect that it not only corresponds to this tenant but also to the database table to be extended by the tenant. However, those skilled in the art may understand that naming and saving the generated description file is not an essential feature or step for implementing the technical solution of extending a database table. That is, even if the description file is not named or saved, the database table may be extended so long as the description file is generated. In the example as given above, the description file describes the defined extended filed X_COL of the database table as the extended column "homeaddress." Of course, one description file may further describe the extended field X_COL as a plurality of extended columns. In view of the above example, those skilled in the art would readily understand how to generate a description file which describes the extended field X_COL as a plurality of extended columns according to a tenant's specific demand. In other words, a description file describes a defined extended field of a database table as at least one extended column. Also, the description file may be considered as functioning to "fill" or "populate" information of table columns to be extended by a tenant into a "skeleton" defined by the extended field. In other words, the description file generated according to a tenant's request for extending a database table is an instantiation of the defined extended field. Of course, such understanding simply helps those skilled in the art to better understand the present invention but does not limit the scope thereof.

Further, it should be noted that according to an embodiment of the present invention, at least one extended column described by the description file has a tree structure. For example, if the home address column to be extended as requested by tenant 1 further contains home phone and living time, then the description file "tenant 1.xsd" of tenant 1 will be modified as below:

```
<?xml version="1.0" encoding="UTF-8"?>
  <xs:schema xmlns:xs="http://www.aa.org/2001/XMLSchema"
    targetNamespace="http://www.bb.com/database/ tenant1"
    xmlns="http://www.bb.com/database/ tenant1">
    <xs:element name="X__COL" type="xs:string" maxOccurs="1"
      minOccurs="1">
        <xs:attribute name="homeaddress" type="xs:string"
        use="optional">
        <xs:attribute name="homephone" type="xs:string"
          use="optional">
        <xs:attribute name="livingtime" type="xs:string"
        use="optional">
         </xs:attribute>
  </xs:element>
</xs:schema>
```

As can be seen, by adding an extended field of XML or Json type, not only an ordinary field but also a tree structure or even other structure model may be extended.

It should be noted still further that where the tenant has once submitted a request for extending a database table and a description file (now description file) corresponding to the tenant has been generated, if that tenant submits a new request for extending the database table, then a new description file corresponding to the tenant is generated in step 102 according to this new request for extending the database table; if there is an existing description file, a description file is created directly. The specific technical solution will be described in the following with reference to FIG. 2.

It is clear from the foregoing description that by using the method as illustrated in FIG. 1, the process of extending a database table is made transparent to either developers of the multi-tenant system or tenants thereof. With the method as illustrated in FIG. 1, a uniform data model is provided to tenants for extending a database table (customization). This uniform data model is just the uniform extended field as reflected in a backend database of the multi-tenant. In the backend database, a uniform and single extended field is defined for a database table, while at the frontend (tenant end) of the multi-tenant system, different description files are generated in response to different requests for extending the database table submitted by tenants. As such, frontend instantiations for a uniform backend extended field may be achieved. With the method as illustrated in FIG. 1, the technical effect of extending a database table without occupying or wasting a large amount of database space can be achieved further, because it is not necessary to predefine quantities of extended blank columns for each database. Moreover, by use of the method as illustrated in FIG. 1, it is not necessary to perform many joint operations between different tables during implementing database processing to the extended database table, because no additional table is added.

Figure 2:
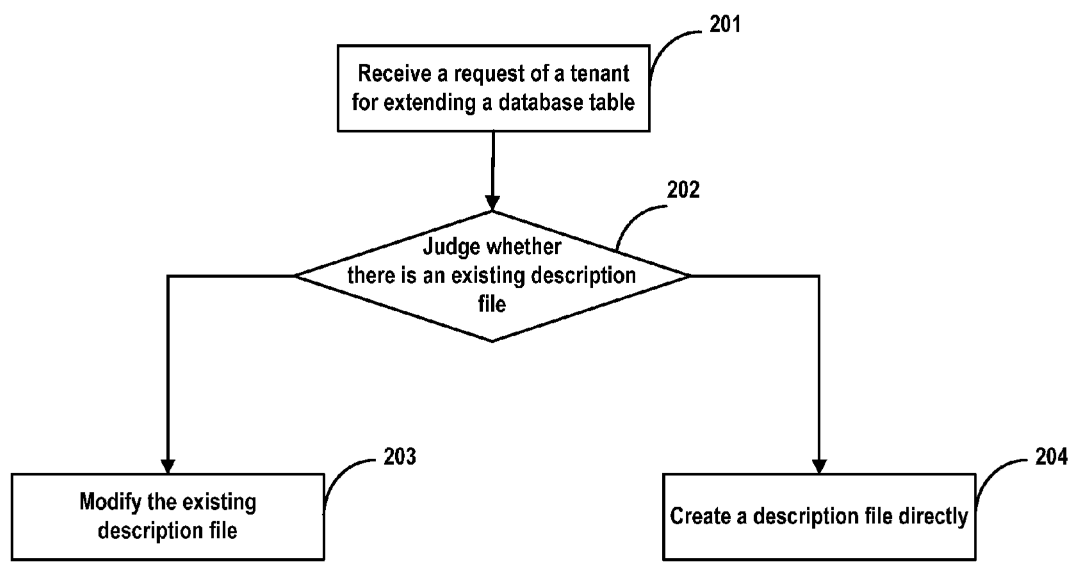
FIG. 2 illustrates a flowchart of a method for extending a database table according to another embodiment of the present invention.

FIG. 2 illustrates a flowchart of a method for extending a database table according to another embodiment of the present invention. Step 201 in FIG. 2 corresponds to step 101 in FIG. 1, and the details thereof are thus omitted here. Unlike step 102 in FIG. 1, there is added a determining step in FIG. 2. That is, upon receipt of the tenant's request for extending a database table, it is determined in step 202 whether there is a description file corresponding to the tenant and the database table, according to identification information of the database table to be extended and the tenant's identity information as contained in the request. If the result of the step 202 is positive ("YES"), the existing description file is modified and covered by a new description file in step 203. That is, no matter how many times a tenant has made a request for extending a database table, there is always only one description file corresponding to this tenant. Of course, the new description file will contain contents of database table extension in the old description file, such that database table columns which the tenant previously requested to extend will not become invalid. Those skilled in the art should understand that the "modifying" in step 203 may be implemented in a plurality of embodiments. According to an embodiment of the present invention, "modifying" comprises reading an old description file and editing it to generate a new description file. According to another embodiment of the present invention, "modifying" is done by first generating a new description file according to a tenant's request for extending a database table, then incorporating content of the old description file into the new one, and finally deleting the old description file. If result of step 202 is negative ("NO"), then a description file corresponding to the tenant is created in step 204 directly.

Figure 3:
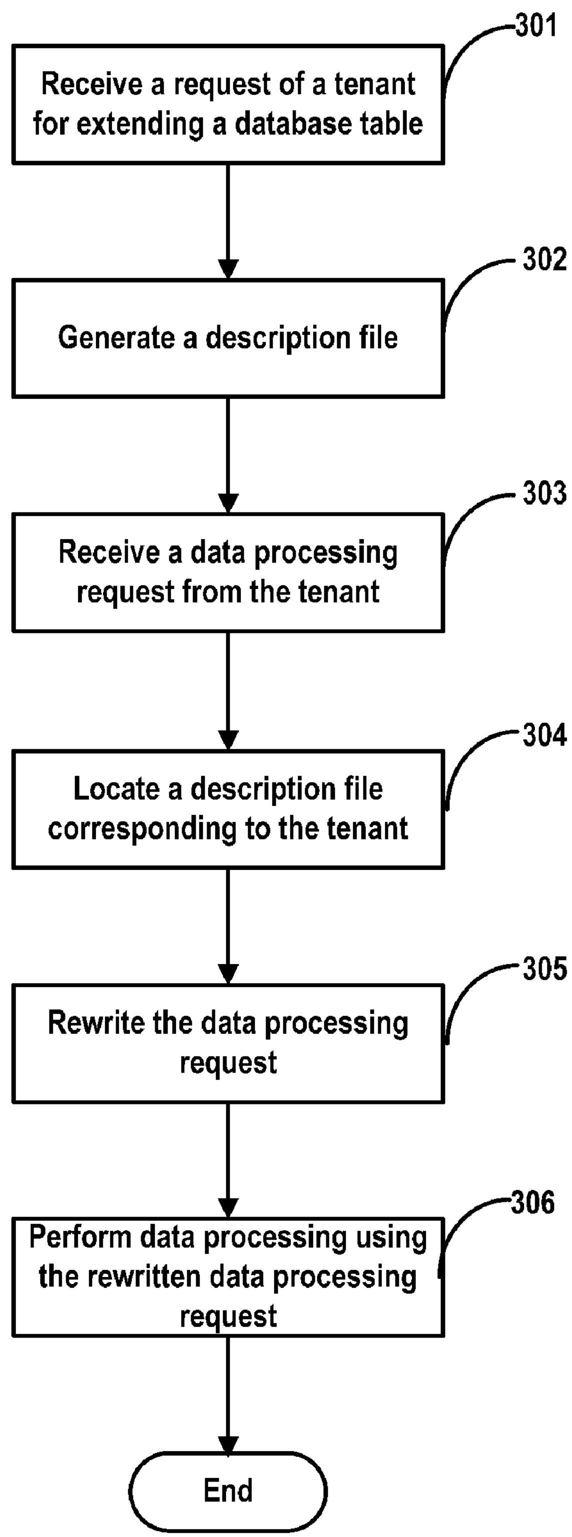
FIG. 3 illustrates a flowchart of a method for extending a database table according to an embodiment of the present invention based on FIG. 1 or FIG. 2.

FIG. 3 illustrates a method for extending a database table according to another embodiment of the present invention. Steps 301 and 302 in FIG. 3 may be considered to be respectively corresponding to steps 101 and 102 in FIG. 1, and the descriptions thereof are omitted here.

In step 303, a data processing request is received from the tenant, the data processing request being associated with an extended field of the database table. The reason why the data processing request is associated with an extended field of the database table is that if a data processing request relates to an original database table only (e.g., querying values of table columns in an original database table), this data processing request may be directly parsed and executed by a database server without committing an error. It should be noted, however, that since a tenant must first log in to submit a data processing request, the data processing request received from the tenant contains the tenant's identity information or identification information. The data processing request submitted by the tenant might include, but not limited to, data insertion, data query, data update, data deletion, etc. In addition, the data processing request does not include a request for extending a database, because if a request for extending a database is received, a description file should be generated.

In step 304, a description file corresponding to the tenant is located according to the tenant's identity information (or called "identification information" contained in the tenant's data processing request and the identification information of a database table to be processed by the data processing request. There might be a great amount of database tables in a multi-tenant system, and for a single tenant, if the tenant submits extension requests on a plurality of database tables, there may be a plurality of description files that correspond to this tenant but to different database tables. For a single database table, if several tenants have submitted a request for extending this database table, there may be a plurality of description files that correspond to this database table but to different tenants. Hence, a correct description file shall be located on the basis of a specific database table to be processed by a data processing request and a specific tenant submitting the request. Those skilled in the art should understand that a tenant's identity information or identification information is saved as the tenant's metadata information in order to facilitate the tenant to log in to the multi-tenant system and perform subsequent operations. This is well-known in SaaS or multi-tenancy technology, and thus the details thereof are omitted here. Those skilled in the art should further understand that after a description is generated in step 302, the generated description file may be saved by certain means, or may be automatically saved by the multi-tenant system. The purpose of saving a description file is to locate the corresponding description file when a data processing request of a tenant is received. It should be noted that the location where the description file is saved is not subjected to any restriction. For example, the description file may be saved in a backend database of the multi-tenant system, in the tenant locally, or in any remote storage means connected via a network such as the Ethernet.

In step 305, the data processing request is rewritten according to content of the located description file. The reason for rewriting the tenant's data processing request lies in that the data processing request is submitted by a tenant according to his knowledge on the frontend (client end) data structure, and the tenant may not know (and in fact does not need to know) that there is actually only one extended field in the backend database tables (multi-tenant system database) without extended table columns presented at the frontend. In this event, if the tenant's data processing request is directly sent to the backend database server of the multi-tenant system, the database server cannot correctly execute this request and en error will be returned. Hence, this problem is solved by rewriting the tenant's data processing request.

For example, if tenant 1 submits a data processing request for inserting a line of records after extending the "homeaddress" column in the original "employee" table, this request's SQL statement may look like Insert into employee (PersonID, EmployeeType, LastName, FirstName, homeaddress) values (1003, 'Regular', 'Yang', Matt', 'Street 1, New York'). In step 304, a description file corresponding to this tenant is located according to the tenant's identity information, which is supposed to be tenant 1.xsd. It can be learned from content of tenant 1.xsd that the "homeaddress" table column is an extended column which is described from the X_COL extended field by the tenant 1.xsd description file. Hence, the above SQL statement of the tenant's request may be rewritten as Insert into employee (PersonID, EmployeeType, LastName, FirstName, X_COL) values(1003, 'Regular', 'Yang', 'Matt', XMLPARSE (document '<X_COL homeaddress="Street 1, New York"/>'), and it is this new statement that will be used for performing data processing (i.e., step 306).

Considering another example concerning query request, if tenant 1 requests to query the name information of an employee whose home address is "Street 1, New York," then the standard SQL statement corresponding to this query request is select LastName, FirstName from employee where homeaddress='Street 1, New York'. Similarly, it can be learned that the "homeaddress" table column is an extended column which is described from the X_COL extended field by the tenant 1.xsd description file. Hence, the above SQL statement of the tenant's request may be rewritten as select LastName, FirstName from employee where XMLEXISTS ("$i/X_COL[@homeaddress='Street 1, New York'" PASSING X_COL AS i), and this new statement will be used for performing data processing (i.e., step 306).

Similarly, upon reading the above description, when a data processing request is a data update request or a data deletion request, those skilled in the art would readily understand how to rewrite this request and perform data processing using the rewritten data processing request.

It should be emphasized that the "performing data processing" in step 306 may be interpreted in a broad sense. It might refer to sending the rewritten data processing request to a database server of the multi-tenant system such that the server performs data processing (at this point, the "performing data processing" in step 306 is actually to send the rewritten data processing request). If the method or system of the present invention is directly implemented in a database server of the multi-tenant system, the "performing data processing" in step 306 may refer to directly executing the rewritten data processing request.

By virtue of the above rewriting mechanism, although the frontend (tenant end) data structure differs from the actual database table structure at the backend of the multi-tenant system, and the tenant might be unaware of such difference, the tenant's data processing request may be mapped to the actual database table structure at the backend, such that it is ensured that not only the operation of extending a database table but also the data processing operation performed to the database after the extension is made transparent to both frontend tenants and backend developers of the multi-tenant system. Further, it is seen from the above example that no joint operation needs to be performed across multiple tables during performing data processing, thereby saving enormous computation resources and enhancing the system performance and user experience. It should be noted that steps 303-306 in FIG. 3 are steps for executing the tenant's data processing request after the completion of the database table extension, and they are not essential steps of the technical solution of the present invention, because the extension of the database table is accomplished once step 302 is completed. Further, it should be noted that the method as illustrated in FIG. 2 may be incorporated into the method as illustrated in FIG. 3.

FIGS. 4A-4D illustrate views of table structural changes of an instance for extending the table according to a further embodiment of the present invention.

FIG. 4A illustrates an unextended "employee" table in the multi-tenant system (platform), wherein this original table comprises three columns, namely "Gender," "Last Name" and "First Name." Suppose two tenants, tenant 1 and tenant 2, are using this multi-tenant system. Tenant 1 wants to add the column "ID" to the original table "employee," while tenant 2 wants to add the column "Home Address" to the original table "employee."

FIG. 4B illustrates the table "employee" where an extended field has been defined, i.e., the actual table structure in the backend database of the multi-tenant system after defining the extended field. It should be noted that as described in FIG. 1 and the relevant description, an extended field may be defined before the multi-tenant system is launched or when a request for extending a database table is received from a tenant during the actual operation process of the multi-tenant system. As illustrated in FIG. 4B, a column "X_COL" is added into the original table "employee", which is an extended field of an XML type. Both tenants 1 and 2 may use this same extended field to add columns to the table "employee" according to their different demands.

FIG. 4C illustrates a frontend (tenant end) data structure presentation after tenant 1 adds the desired column "ID." As illustrated in FIG. 4C, the table structure as presented to tenant 1 has contained the column "ID," while this column "ID" does not exist in the actual backend database table. The structure of the actual backend table "employee" is still as illustrated in FIG. 4B.

FIG. 4D illustrates a frontend (tenant end) data structure presentation after tenant 2 adds the desired column "Home Address." As illustrated in FIG. 4D, the table structure as presented to tenant 2 has contained the column "Home Address" and does not contain the column "ID" which is presented to tenant 1. In fact, the column "Home Address" does not exist in the actual backend database table as well. The structure of the actual backend table "employee" is still as illustrated in FIG. 4B.

A detailed description has been provided in FIGS. 1-3 and relevant description regarding how tenant 1 and tenant 2 extends the database table and how the system executes data processing requests which are submitted by the two tenants subsequently.

Figure 5:
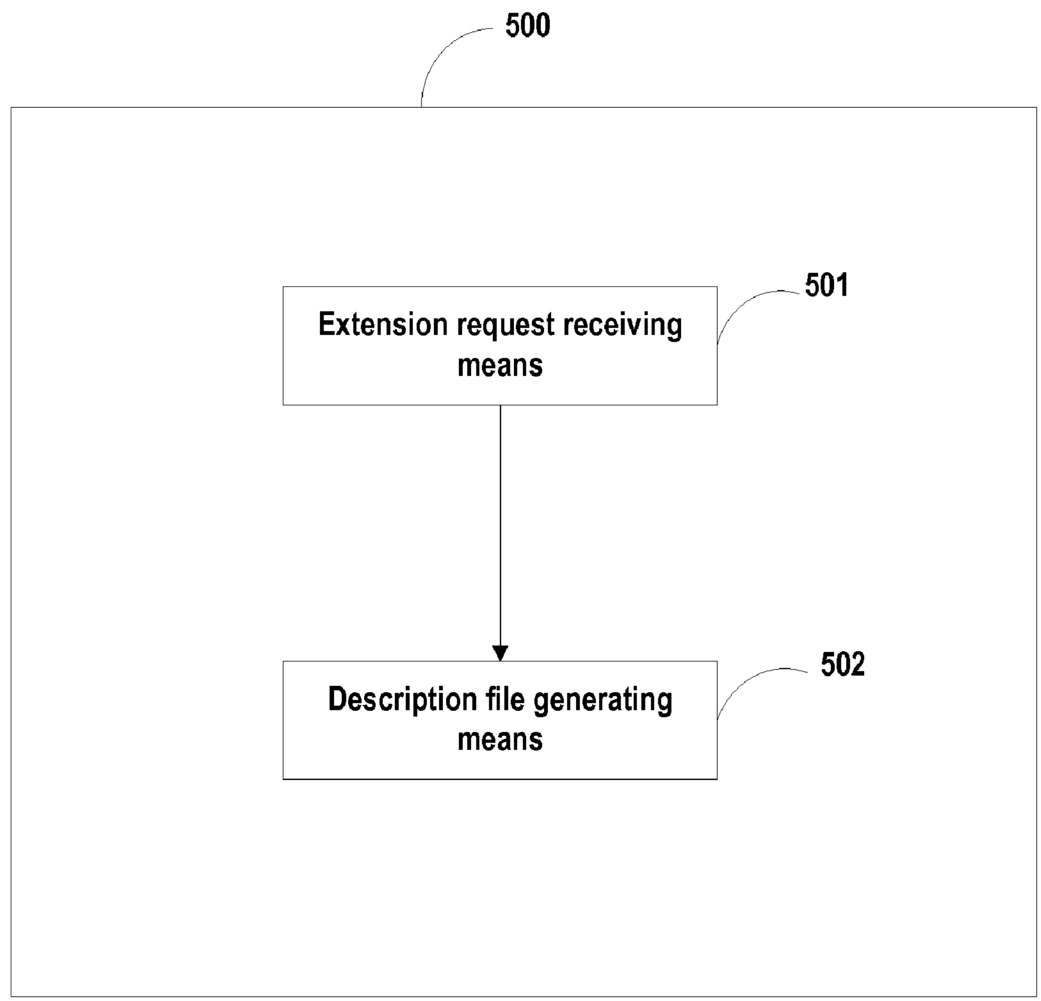
FIG. 5 illustrates a structural diagram of a system for extending a database table according to an embodiment of the present invention.

FIG. 5 illustrates a structural diagram of a system for extending a database table according to an embodiment of the present invention. The system illustrated in FIG. 5 is denoted by 500 as a whole. System 500 comprises: extension request receiving means 501 for receiving a request of a tenant for extending a database table; and description file generating means 502 for generating a description file corresponding to the tenant according to the received request, the description file describing an extended field defined for the database table as at least one extended column. It is to be understood that means 501 and 502 in system 500 respectively correspond to steps 101 and 102 in the flowchart as illustrated in FIG. 1. With the system 500 as illustrated in FIG. 5, it is possible to make the process of extending a database table transparent to either developers of the multi-tenant system or tenants themselves, to provide a uniform data model to tenants for extending database tables (customization), and to achieve the technical effect of extending a database table without occupying or wasting a large amount of database space, and it is not necessary to perform joint operations among different tables during performing database processing to the extended database table, because no new table is added.

Figure 6:
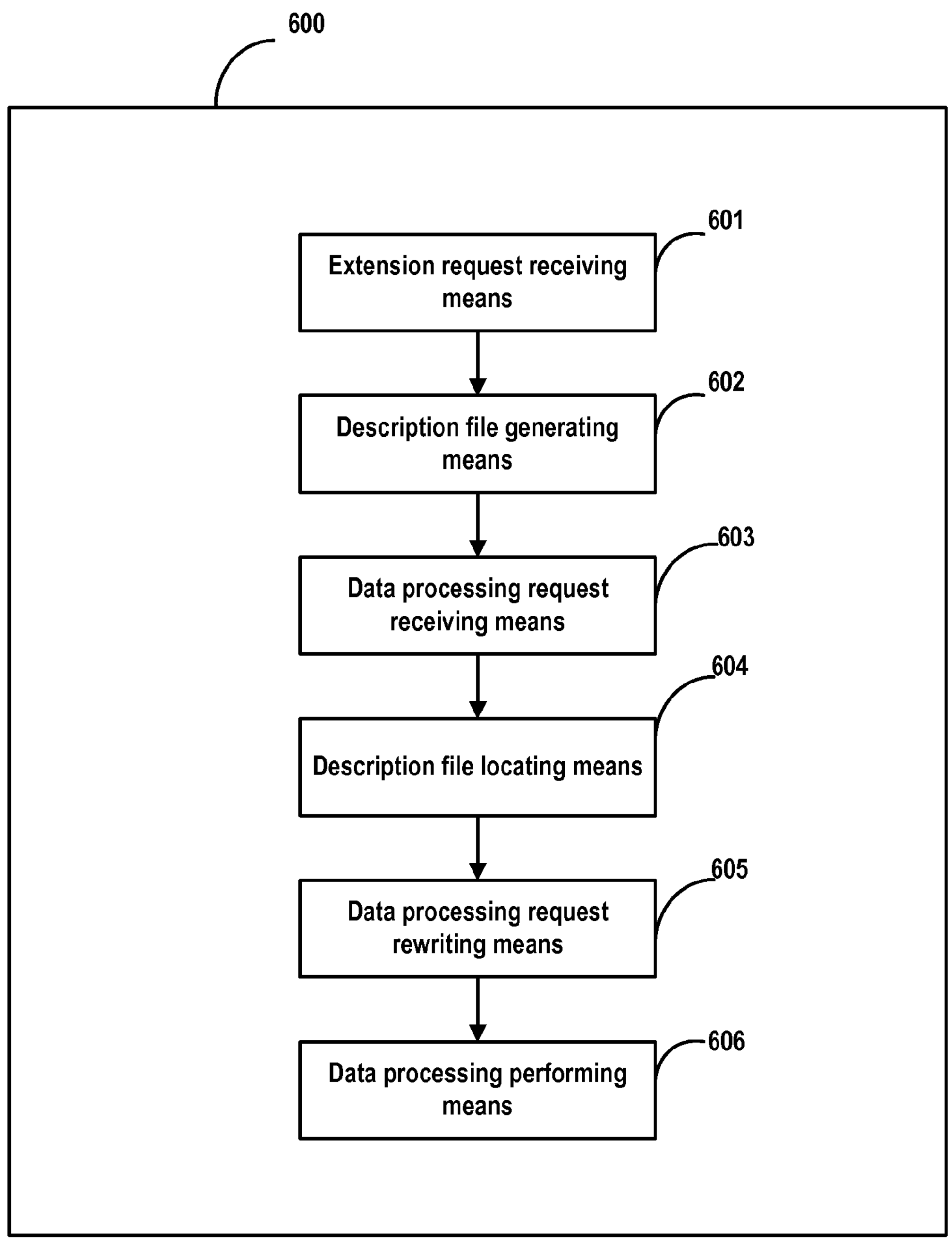
FIG. 6 illustrates a structural diagram of a system for extending a database table according to another embodiment of the present invention respectively.

FIG. 6 illustrates a structural diagram of a system for extending a database table according to another embodiment of the present invention. The system illustrated in FIG. 6 is denoted by 600 as a whole. System 600 comprises: extension request receiving means 601 for receiving a request of a tenant for extending a database table; description file generating means 602 for generating a description file corresponding to the tenant and the database table according to the received request, the description file describing an extended field defined for the database table as at least one extended column; data processing request receiving means 603 for receiving a data processing request submitted by the tenant; description file locating means 604 for locating a corresponding description file according to identity information of the tenant submitting the data processing request; data processing request rewriting means 605 for rewriting the data processing request submitted by the tenant according to content of the located description file; and data processing performing means 606 for performing data processing using the rewritten data processing request. It is to be understood that means 601-606 in system 600 respectively correspond to steps 301-306 in the flowchart as illustrated in FIG. 3. However, it should be noted that means 603-606 in system 600 are used for executing the data processing request submitted by the tenant after completion of extension of the database table, and they are not essential constituent parts of the technical solution of the present invention. Means 603-606 are illustrated in FIG. 6 to indicate that using system 600 as illustrated in FIG. 6, it is possible to ensure transparency to both frontend tenants and backend developers of the multi-tenant system not only during the operation of extending the database table but also during the operation of performing data processing to the database after completion of extension.

It should be emphasized that each of description file generating means 502 in system 500 as illustrated in FIG. 5 and description file generating means 602 in system 600 as illustrated in FIG. 6 may be further configured to perform steps 202-204 as illustrated in FIG. 2.

Further, it should be emphasized that the methods or systems according to the embodiment of the present invention may be deployed or implemented at the tenant end, at the server end of the multi-tenant system, or at any location or area so long as communication with the tenant end or server end of the multi-tenant system can be enabled at this location or area.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

For convenience, the Detailed Description includes the following definitions which have been derived from the "Draft NIST Working Definition of Cloud Computing" by Peter Mell and Tim Grance, dated Oct. 7, 2009, which is cited in an IDS filed herewith, and a copy of which is attached thereto.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
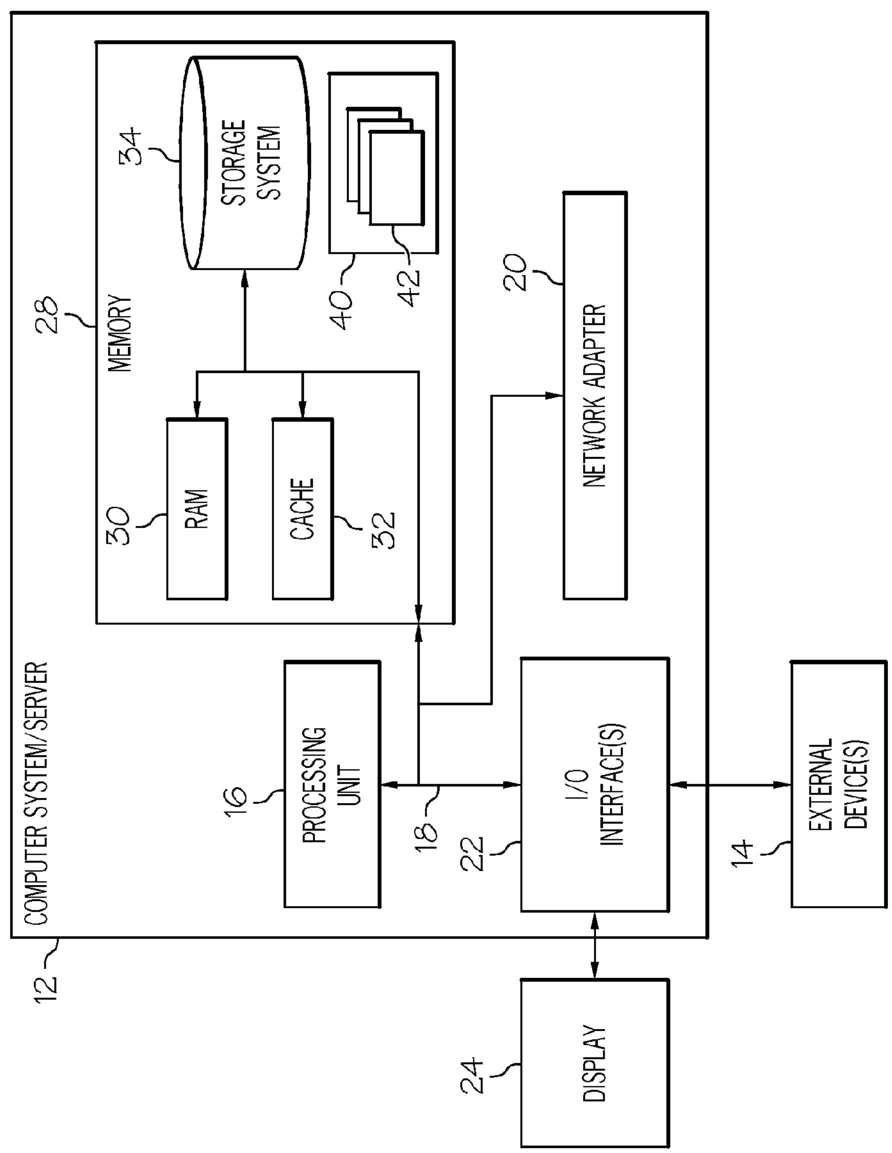
FIG. 7 depicts a cloud computing node according to an embodiment of the present invention.

Referring now to FIG. 7, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 8:
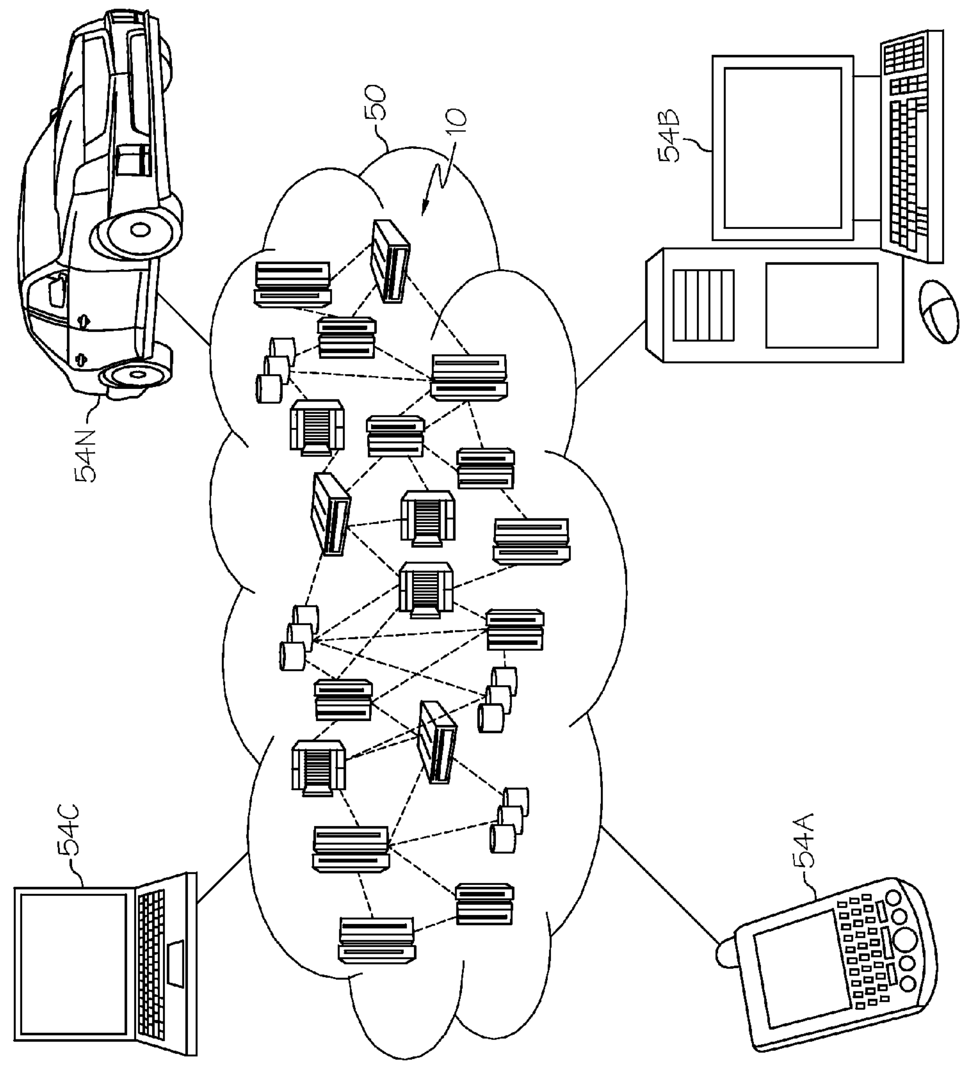
FIG. 8 depicts a cloud computing environment according to an embodiment of the present invention.

Referring now to FIG. 8, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
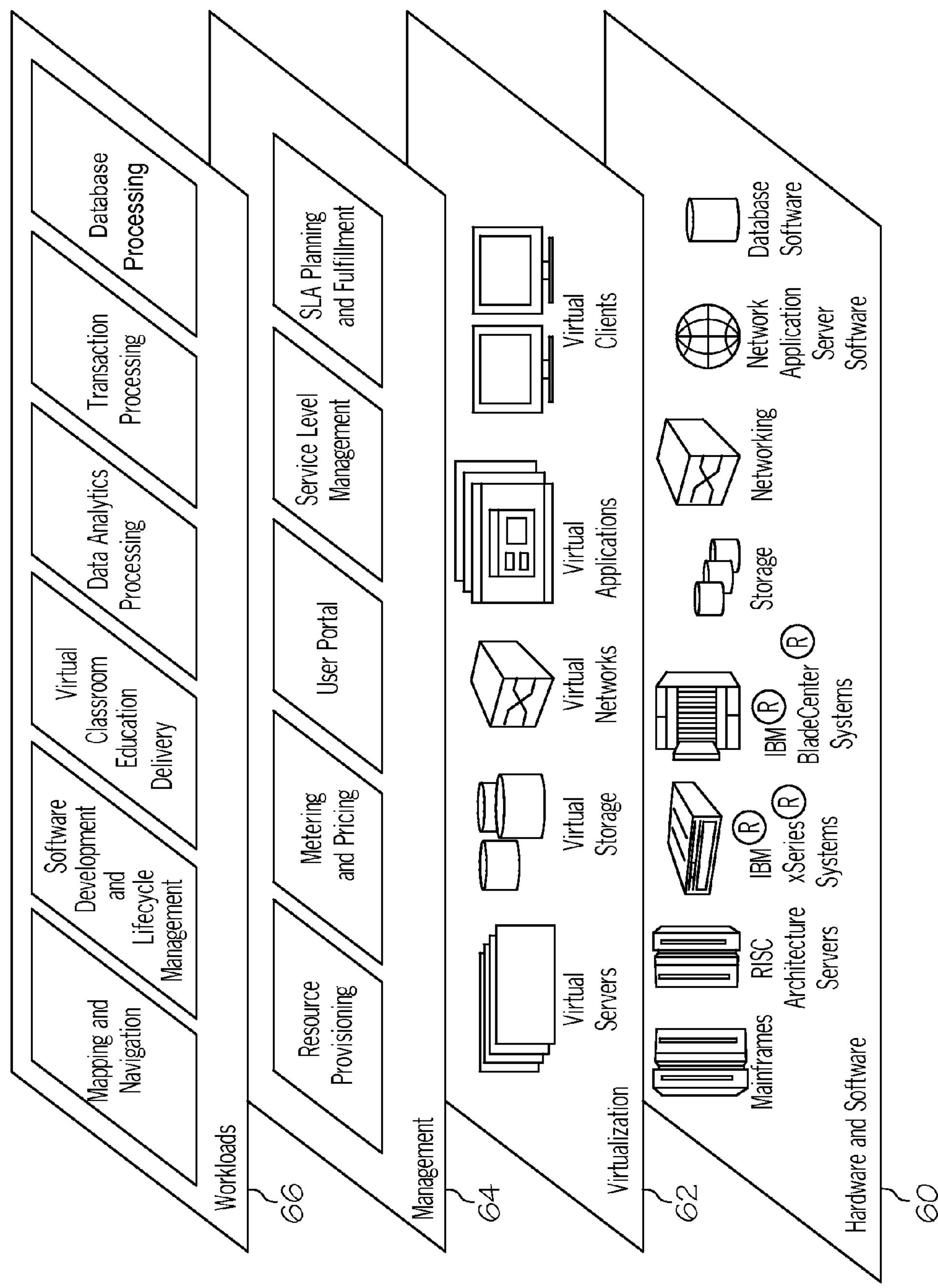
FIG. 9 depicts abstraction model layers according to an embodiment of the present invention.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and database request processing (including processing requests from tenants to extend the database table in the manner described above).

As will be appreciated by one skilled in the art, aspects of the present invention may be embodied as a system, method or computer program product. Accordingly, aspects of the present invention may take the form of an entirely hardware embodiment (as a VLSI or gate array, semiconductor like a logic chip and a transistor, or a programmable hardware device like a field programmable gate array and a programmable logic device), an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowcharts and/or block diagram block or blocks.

The flowchart and block diagrams in the above-described Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Although specific systems, articles and methods have been described in detail with reference to the foregoing concrete embodiments, the present invention is not limited thereto. Under the teaching of this specification, those of ordinary skill in the art can make various alterations, replacements, and modifications to the present invention without departing from the spirit and scope thereof. It is to be understood that all these alterations, replacements, and modifications still fall within the scope of the present invention as defined by the appended claims.

What is claimed is:

1. A computer-implemented method to provide a database table adaptable to include tenant-specific and tenant-neutral columns, the method comprising:

receiving, from a first tenant of a plurality of tenants, a request to adapt a database table in a multi-tenant database system to include a first tenant-specific column that is specific to the first tenant, wherein the database table has an associated schema specifying that the database table includes an extended field;

adapting the database table to include the first tenant-specific column by generating a first description file corresponding to the first tenant and to the database table according to the received request and by operation of one or more computer processors, the first description file associating the extended field with the first tenant-specific column; and rewriting, based on the first description file, a data processing request received from the first tenant and pertaining to the first tenant-specific column, wherein the first description file is located according to identification information contained in the data processing request, wherein data processing is performed using the rewritten data processing request.

2. The method according to claim 1, wherein generating a first description file corresponding to the first tenant according to the received request comprises:

determining whether there is an existing description file corresponding to the first tenant and to the database table according to the received request; and upon determining that there is an existing description file corresponding to the first tenant and to the database table according to the received request, generating a first description file corresponding to the first tenant and to the database table by modifying the existing description file.

3. The method according to claim 2, wherein generating a first description file corresponding to the first tenant according to the received request further comprises:

upon determining that there is no existing description file, creating a first description file corresponding to the first tenant and to the database table.

4. The method according to claim 1, wherein data for each tenant-neutral column is stored in a table data structure associated with the database table, wherein data for each tenant-specific column is stored in a predefined set of files selected from: (i) a set of description files associated with the database table and different from the table data structure and (ii) a set of data files associated with the set of description files and different from the table data structure;

wherein the data for each tenant-neutral column is not stored in the predefined set of files, wherein the data for each tenant-specific column is not stored in any table data structure.

5. The method according to claim 4, wherein each tenant-neutral column is added to the database table by modifying the schema and without modifying any description file and without generating any description file;

wherein each tenant-specific column is added to the database table by description file generation or modification to associate the extended field with the respective tenant-specific column, without modifying the schema to add any field selected from a standard field and an extended field;

wherein each tenant-neutral column corresponds to a standard field of the database table, that is generated for the respective tenant-neutral column, and wherein each tenant-specific column is associated with the extended field of the database table via a respective description file.

6. The method according to claim 5, wherein the database table is adapted to include the first tenant-specific column without modifying the schema to add any field selected from a standard field and an extended field, wherein data for the first tenant-specific column is stored in the predefined set of files and not in any table data structure, wherein the method further comprises:

receiving, from a second tenant of a plurality of tenants, a request to adapt the database table to include a second tenant-specific column that is specific to the second tenant; and adapting the database table to include the second tenant-specific column by generating a second description file corresponding to the second tenant and to the database table according to the request received from the second tenant, without modifying the schema to add any field selected from a standard field and an extended field, wherein the second description file further associates the extended field with the second tenant-specific column, wherein data for the second tenant-specific column is stored in the predefined set of files and not in any table data structure.

7. The method according to claim 6, wherein the method further comprises:

receiving, from the second tenant of a plurality of tenants, a request to adapt the database table to include a third tenant-specific column that is specific to the second tenant; and adapting the database table to include the third tenant-specific column by updating the second description file corresponding to the second tenant and to the database table according to the request received from the second tenant, without modifying the schema to add any field selected from a standard field and an extended field, wherein the updated second description file further associates the extended field with the third tenant-specific column, wherein data for the third tenant-specific column is stored in the predefined set of files and not in any table data structure.

8. The method according to claim 7, wherein the method further comprises:

receiving a request to adapt the database table to include a first tenant-neutral column that is not specific to any tenant; and adapting the database table to include the first tenant-neutral column by updating the schema to add a first standard field to the database table, without modifying any description file and without generating any description file, wherein the first standard field is configured to store, in the table data structure and not in the predefined set of files, data for the first tenant-neutral column.

9. The method according to claim 8, wherein the method further comprises:

receiving a request to adapt the database table to include a second tenant-neutral column that is not specific to any tenant; and adapting the database table to include the second tenant-neutral column by updating the schema to add a second standard field to the database table, without modifying any description file and without generating any description file, wherein the second standard field is configured to store, in the table data structure and not in the predefined set of files, data for the second tenant-neutral column.

10. The method according to claim 9, wherein the schema is modified to reflect the extended field: (i) upon first receiving a tenant request to adapt the database table to include a tenant-specific column or (ii) prior to receiving any tenant request to adapt the database table to include a tenant-specific column;

wherein each tenant-specific column is added to the database table without modifying the schema and without incurring a storage cost associated with reserving a predefined count of extended fields in the database table, wherein the predefined count is greater than one;

wherein each generated description file is tenant-specific and table-specific, wherein the first tenant-specific column is not specific to the second tenant, wherein the second tenant-specific column and the third tenant-specific column are not specific to the first tenant.

11. The method according to claim 10, wherein the extended field comprises an XML extended field, wherein at least one of the first tenant-specific column, the second tenant-specific column, and the third tenant-specific column is of a tree structure specified by the corresponding description file;

wherein at most a single extended field is defined for each of a plurality of database tables including the database table, wherein each single extended field is configured to accommodate addition of tenant-specific columns from multiple tenants of the plurality of tenants;

wherein generating a first description file corresponding to the first tenant according to the received request comprises:

upon determining that there is an existing description file corresponding to the first tenant and to the database table according to the received request, modifying the existing description file; and upon determining that there is no existing description file corresponding to the first tenant and to the database table, generating the first description file corresponding to the first tenant and to the database table.

12. The method according to claim 11, wherein the multi-tenant database system is configured such that multiple tenant-specific columns are added to the database table via the extended field, while allowing data processing requests to be composed in a manner that regards the tenant-specific columns as standard fields of the database table, thereby abstracting the extended field and the description files, from the plurality of tenants, wherein the data processing request comprises at least one of a data insertion request, a data query request, a data update request, and a data deletion request, wherein the data processing request is expressed in a manner that regards the first tenant-specific column as corresponding to a standard field and not to any extended field, wherein the identification information contained in the data processing request comprises identification information of the first tenant and of the database table, respectively, wherein the data processing request is rewritten according to content of the located description file, such that the rewritten data processing request is expressed in a manner that reflects the first tenant-specific column corresponding to the extended field and not corresponding to any standard field.

13. A system to provide a database table adaptable to include tenant-specific and tenant-neutral columns, the system comprising:

a hardware storage element containing a database table; and a processor which, when executing a program, is configured to:

receive, from a first tenant of a plurality of tenants, a request to adapt a database table in a multi-tenant database system to include a first tenant-specific column that is specific to the first tenant, wherein the database table has an associated schema specifying that the database table includes an extended field;

adapt the database table to include the first tenant-specific column by generating a first description file corresponding to the first tenant and to the database table according to the received request, the first description file associating the extended field with the first tenant-specific column; and rewrite, based on the first description file, a data processing request received from the first tenant and pertaining to the first tenant-specific column, wherein the first description file is located according to identification information contained in the data processing request, wherein data processing is performed using the rewritten data processing request.

14. The system according to claim 13, wherein generating a first description file corresponding to the first tenant according to the received request by the processor comprises:

determining whether there is an existing description file corresponding to the first tenant and to the database table according to the received request;

upon determining that there is an existing description file corresponding to the first tenant and to the database table according to the received request, generating a first description file corresponding to the first tenant and to the database table by modifying the existing description file; and upon determining that there is no existing description file, creating a description file corresponding to the first tenant and to the database table.

15. A computer program product to provide a database table adaptable to include tenant-specific and tenant-neutral columns, the computer program product comprising:

a computer-readable storage medium having computer-readable program code embodied therewith, the computer-readable program code comprising:

first computer-readable program code configured to receive, from a first tenant of a plurality of tenants, a request to adapt a database table in a multi-tenant database system to include a first tenant-specific column that is specific to the first tenant, wherein the database table has an associated schema specifying that the database table includes an extended field;

second computer-readable program code configured to adapt the database table to include the first tenant-specific column by generating a first description file corresponding to the first tenant and to the database table according to the received request and by operation of one or more computer processors when executing the computer-readable program code, the first description file associating the extended field with the first tenant-specific column; and third computer-readable program code configured to rewrite, based on the first description file, a data processing request received from the first tenant and pertaining to the first tenant-specific column, wherein the first description file is located according to identification information contained in the data processing request, wherein data processing is performed using the rewritten data processing request.

16. The computer program product according to claim 15, wherein the second computer-readable program code is further configured to generate the first description file by:

determining whether there is an existing description file corresponding to the first tenant and to the database table according to the received request; and upon determining that there is an existing description file, modify the existing description file to generate the first description file corresponding to the first tenant and to the database table.

17. The computer program product according to claim 15, wherein the second computer-readable program code, upon determining that there is no existing description file, is configured to create the first description file corresponding to the first tenant and to the database table.

* * * * *